July 17, 1928.

E. WULKAN 1,677,314

PROCESS FOR MAKING COLD SWELLING STARCH

Original Filed Aug. 12, 1924

INVENTOR
Eugene Wulkan
BY
Newell and Spencer
ATTORNEY

Patented July 17, 1928.

1,677,314

UNITED STATES PATENT OFFICE.

EUGENE WULKAN, OF VIENNA, AUSTRIA, ASSIGNOR TO HABERLAND MANUFACTURING COMPANY, OF ALLWOOD, NEW JERSEY, A CORPORATION OF NEW JERSEY.

PROCESS FOR MAKING COLD SWELLING STARCH.

Application filed August 12, 1924, Serial No. 731,557. Renewed December 7, 1927.

The present invention relates to a process for the production of cold swelling starch and more particularly to a process of producing cold swelling starch from ordinary starch, which process may be readily controlled and by which the use of costly apparatus, necessary for carrying out the processes heretofore employed, may be avoided.

The ordinary form of starch, such as cornstarch, for example, is entirely insoluble in water but may be readily converted to a modified form by which its properties are altered so as to render it applicable to a variety of uses.

The method by which cold swelling starch has heretofore been commonly produced from ordinary starch, involves heating ordinary starch with water to 70° or 80° C., which causes the starch grains to swell and burst, producing a solution which when cold forms ordinary starch paste. This starch paste is then dried by means of any suitable apparatus, such as cylinder driers or a vacuum apparatus, involving either film drying or drying by the use of a spray. The dried material is then finely ground so that it will readily mix with cold water so as to form a paste again.

Another method which has been employed to obtain starch paste from ordinary starch involves mixing starch with cold water so as to form a mixture or suspension thereof, and then allowing the suspension or mixture to flow in suitable amounts into boiling water. The starch paste thus formed is then dried by one of the forms of apparatus above mentioned.

The cost of the apparatus in the processes heretofore employed for forming cold swelling starch is very high and greatly increases the cost of production thereof. Moreover, the time consumed in forming the starch paste and thereafter drying the mass to attain the cold swelling starch in dried form, is excessive, and increases the cost of its production.

It is the primary object of the present invention to provide a process by means of which the use of the costly apparatus heretofore employed may be entirely avoided.

Another object of the invention is to provide a process which shall be more rapid than the processes heretofore used, by means of which the time necessary for the completion of the process may be greatly reduced.

Another object of the invention is to provide a process by which the cost of production of cold swelling starch may be greatly decreased.

With these and other objects in view, the invention comprises the following features hereinafter described and more particularly defined in the claims.

Figure 1:
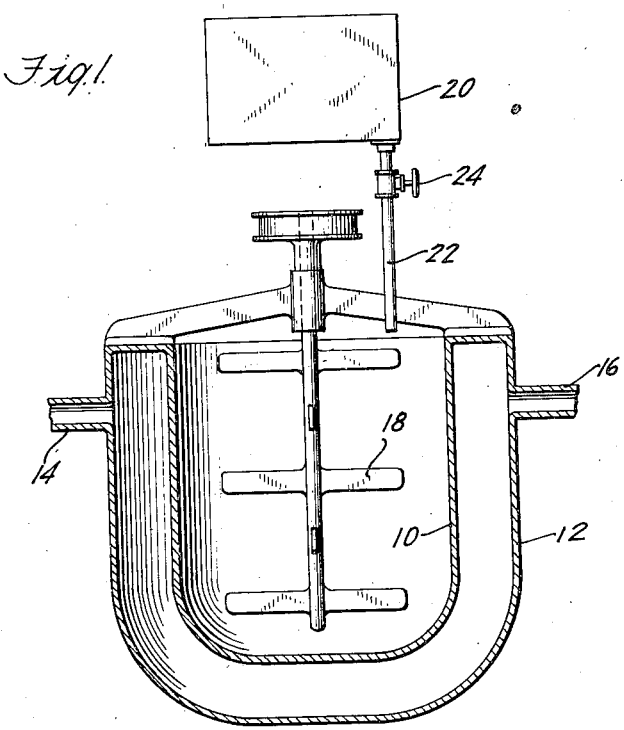
Figure 3:
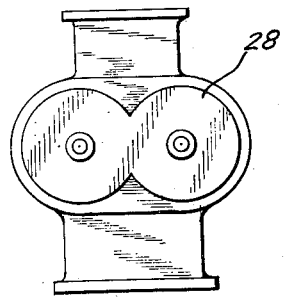
Figure 2:
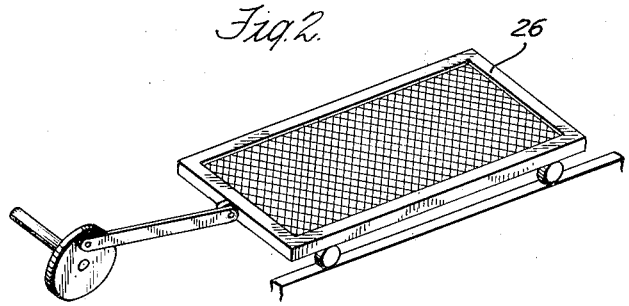

A form of apparatus by which the invention may be carried out is illustrated in the accompanying drawings, in which Fig. 1 is a view in elevation of a form of apparatus in which the starch may be treated;

Fig. 2 is a view in perspective of a form of screen adapted to separate converted starch from the unconverted starch; and Fig. 3 is a view of a form of grinding apparatus for grinding the starch balls to a powder.

The preferred manner of carrying out my invention comprises heating dry starch in an open vessel or tank 10, which is provided with suitable heating means. I preferably employ a tank having a jacket 12 through which steam may be passed through pipes 14, 16, for example, by means of which the starch may be heated to any desired extent. The dried starch is preferably heated to above the temperature at which in the presence of water it would become pasty, or form the ordinary starch paste. I preferably employ a temperature of from 100° to 110° C., although temperatures beyond these limits may be employed if found desirable.

During the heating of the dried starch, the mass is stirred by any suitable form of stirrers, 18 in order to produce uniform heating of the mass. When the mass of starch has been heated to the desired temperature, a liquid, preferably water, is allowed to flow into the starch drop by drop from a tank 20 through a pipe 22 for example, which may be controlled by a valve 24. The receptacle 20 is preferably placed above the tank 10 so as to permit the water to flow to the starch containing tank by gravity. The drops of water falling into the hot starch are immediately heated and react with the starch to form balls or masses of starch paste, which through the stirring, by means of the stirring apparatus 18 become submerged below the surface of the starch mass. The starch balls are rapidly dried at the temperature to which they are subjected within the body of the starch mass.

In place of permitting the water to flow drop by drop into the stirred mass of starch, I may employ a water-distributing apparatus which will permit water to drop into the mass at a plurality of points; I may if desired employ a spray of any desired form, although a spray operating intermittently, would best serve the purpose, by means of which water would be supplied to the mass at a rate such that the stirring would remove or submerge the paste balls as rapidly as formed. It is to be understood, that the rate of supply of water to the heated mass must be regulated in order not to cool the mass of starch below the temperature at which conversion thereof into cold swelling starch will take place.

After the major portion of the mass of starch has been formed into starch balls, the mass is transferred to a suitable sifting means, such as a shaking screen 26, illustrated in Fig. 2, by means of which the adhering unconverted starch may be separated from the dried starch paste balls. The starch balls are then ground by means of any suitable form of grinding apparatus 28, indicated in Fig. 3, and the dried starch paste, or cold swelling starch, is then ready for use or to be put on the market.

I may, if desired, employ some reagent with the water to assist in the conversion of the starch to starch paste. For this purpose I may add one or more of the following reagents; a fixed or volatile alkali or an alkali metal carbonate, or a diluted mineral or organic acid, or a material giving off oxygen, or a neutral or other salt or organic material, such as formaldehyde, for example.

As a specific example of the mode of carrying out the process with the use of a reagent, I may employ ammonia which may be added to the extent of approximately three per cent of the water, which is passed drop by drop to the starch mass. The ammonia solution may, if desired, be heated before being passed to the starch mass in the tank. It is preferable to heat the starch body to a temperature of about 100° to 110° C. and to stir the mass during the addition of the ammonia solution thereto. The drops of ammonia water convert the starch into starch paste in the same manner as in the process above described, forming paste balls which, when submerged through the stirring of the starch mass, are dried and may be subsequently separated from the unconverted starch and thereafter ground to a suitable fineness.

It is to be understood that the method which has been described constitutes the preferred mode of carrying out the process, but various changes or modifications may be made therein without departing from the spirit of the invention or the scope thereof, as defined in the claims. I may, for example, remove the wet balls from the starch mass as they are formed without giving them sufficient time to dry in the mass of starch, and thereafter to dry them in a drying oven or other suitable drying apparatus.

Having thus described the invention, what is claimed as new is:

1. A method for the preparation of cold swelling starch, which comprises heating starch to a temperature at which, in the presence of water, cold swelling starch may be formed, permitting water to flow drop by drop to the starch while so heated to form paste balls, and thereafter drying the paste balls.

2. A method for the preparation of cold swelling starch, which comprises heating a body of starch to a temperature at which, in the presence of water, cold swelling starch may be formed, adding water thereto drop by drop to form paste balls, and stirring the mass to submerge the balls beneath the surface of the body of starch, to thereby cause drying of the starch balls.

3. A method for the preparation of cold swelling starch, which comprises heating a mass of starch to a temperature of substantially 100° to 110° C., passing water thereto drop by drop to form paste balls, stirring the mass of starch during the addition of water thereto to distribute through the mass the paste balls which are formed and to cause drying thereof, and thereafter separating the balls from the remaining starch mass.

4. A method for the preparation of cold swelling starch, which comprises heating a mass of starch to a temperature at which it would form cold swelling starch with water, passing to the starch mass drop by drop a solution of ammonia in water to form paste balls, agitating the mass to submerge the paste balls and to cause drying thereof, thereafter separating the balls from the remaining starch, and grinding the balls to a finely powdered mass.

5. A method for the preparation of cold swelling starch, which comprises heating a mass of starch to a temperature at which cold swelling starch would be formed in the presence of water, introducing a reacting liquid in small individual drops or particles into the starch mass whereby individual paste balls are formed as distinguished from mass formation of paste, and thereafter drying the individual paste balls.

6. A method which comprises the heating of dry starch to a temperature above 100° C.

7. A method which comprises the heating of dry starch to a temperature of 100° C. and agitating the starch mass during such heating.

Signed at Vienna, Austria, this 26th day of July, 1924.

EUGENE WULKAN.